US007596748B2

(12) United States Patent
Raghavachari et al.

(10) Patent No.: US 7,596,748 B2
(45) Date of Patent: Sep. 29, 2009

(54) METHOD FOR VALIDATING A DOCUMENT CONFORMING TO A FIRST SCHEMA WITH RESPECT TO A SECOND SCHEMA

(75) Inventors: Mukund Raghavachari, Baldwin Place, NY (US); Oded Shmueli, Nofit (IL)

(73) Assignee: International Business Machines Corporation, Armonk, NY (US)

( * ) Notice: Subject to any disclaimer, the term of this patent is extended or adjusted under 35 U.S.C. 154(b) by 568 days.

(21) Appl. No.: 10/662,799

(22) Filed: Sep. 12, 2003

(65) Prior Publication Data

US 2005/0060645 A1   Mar. 17, 2005

(51) Int. Cl.
G06F 17/30 (2006.01)
(52) U.S. Cl. .................... 715/237; 715/234; 715/239
(58) Field of Classification Search ............ 715/513, 715/237, 234
See application file for complete search history.

(56) References Cited

U.S. PATENT DOCUMENTS

2004/0216030 A1* 10/2004 Hellman et al. ............ 715/500

OTHER PUBLICATIONS

Thompson, Henry S., et al., "A Standards-based XML Schema Implementation Comparison Framework," HCRC Language Technology Group, World Wide Web Consortium, Aug. 14-17, 2001, cover page and pp. 1-7.*
Thompson, Henry S., "W3C XML Schema Test Collection," W3C, Jan. 16, 2002, http://www.w3.org/2001/05/xmlschema-test-collection.html, downloaded pp. 1-9.*

"XML Schema Test Results, Microsoft: complex type," reported Jan. 16, 2002, http://www.w3.org/XML/2001/05/xmlschema-test-collection/result-ms-complexType.htm, downloaded pp. 1-178.*
"XML Schema Test Results, Microsoft: simpleType," reported Jan. 16, 2002, http://www.w3.org/2001/05/xmlschema-test-collection/result-ms-simpleType.htm, downloaded pp. 1-62.*
"XML Schema Test Results—Jan. 16, 2002—Sun contributions, full report," reported Jan. 16, 2002, http://www.w3.org/2001/05/xmlschema-test-collection/resultSun.htm, downloaded pp. 1-36.*
Tobin, R. and Thompson, H., "A schema for serialized infosets," paper, published on the Internet as of Jun. 24, 2003, http://www.w3.org/2001/05/serialized-infoset-schema.html, downloaded pages, including attached Web Archives pp. 1-8.*

(Continued)

Primary Examiner—Stephen Hong
Assistant Examiner—Matthew J Ludwig
(74) Attorney, Agent, or Firm—Michael J. Buchenhorner; Vazken Alexanian

(57) ABSTRACT

A method of validating a document structured in accordance with a first schema and with respect to a second schema saves processing time by using information about relationships between the first schema and second schema and the document's conformance to the first schema to determine the document's validity in the second schema. The element type definitions of the XML or other document cast in the first schema are examined to determine if any element conforming to element types in the first schema is always invalid in the second schema. If any content conforming to always invalid element types is present in the document, the document can be immediately invalidated with respect to the second schema without further processing. Any content conforming to element types in the first schema that are subsumed by element types in the second schema can be immediately validated with respect to the second schema.

20 Claims, 8 Drawing Sheets

OTHER PUBLICATIONS

Gkoutos, Rzepa, and Murray-Rust, Online Validation and Comparison of Molfile and CML Molecular Atom-Connection Descriptors, Jun. 24, 2003, http://web.archive.org/web/20030624230758/http://www.ch.ic.ac.uk/gkoutos/steve/, downloaded pp. 1-8.*

Eckstein, R., "XML Pocket Reference," O'Reilly & Associates, Inc., Oct. 1999, chapter and section 1.4, downloaded from ProQuest Safari Tech Books Online, downloaded pp. 1-23.*

Thompson, Henry S., et al., "A Standards-based XML Schema Implementation Comparison Framework," HCRC Language Technology Group, World Wide Web Consortium, Aug. 14-17, 2001, downloaded from: http://www.mulberrytech.com/Extreme/Proceedings/xslfo-pdf/2001/Thompson01/EML2001Thompson01.pdf, downloaded pp. 1-7, previously provided to Applicants.*

Thompson, Henry S., "W3C XML Schema Test Collection," W3C, Jan. 16, 2002, last downloaded by the Examiner on Jan. 31, 2006 from: http://www.w3.org/2001/05/xmlschema-test-collection.html, downloaded pp. 1-9, previously provided to Applicants.*

A subset of test results from Microsoft on complex type elements, last downloaded by the Examiner on Feb. 1, 1006 from: http://www.w3.org/XML/2001/05/xmlschema-test-collection/result-ms-complexType.htm, downloaded pp. 1-178, which are linked to the "W3C XML Schema Test Collection" previously provided to Applicants.*

* cited by examiner

```
<xsd:element name="purchaseOrder" type="POType1"/>
<xsd:element name="comment" type="xsd:string"/>

<xsd:complexType name="POType1">
  <xsd:sequence>
    <xsd:element name="shipTo" type="USAddress"/>
    <xsd:element name="billTo" type="USAddress" minOccurs="0"/>
    <xsd:element ref="comment" minOccurs"0"/>
    <xsd:element name="items" type="items"/>
  <xsd:sequence/>
<xsd:complexType/>
```

*Fig. 1a*

```
<xsd:element name="purchaseOrder" type="POType2"/>
<xsd:element name="comment" type="xsd:string"/>

<xsd:complexType name="POType2">
  <xsd:sequence>
    <xsd:element name="shipTo" type="USAddress"/>
    <xsd:element name="billTo" type="USAddress"/>
    <xsd:element ref="comment" minOccurs"0"/>
    <xsd:element name="items" type="items"/>
  <xsd:sequence/>
<xsd:complexType/>
```

*Fig. 1b*

METHOD FOR VALIDATING A DOCUMENT CONFORMING TO A FIRST SCHEMA WITH RESPECT TO A SECOND SCHEMA

CROSS-REFERENCE TO RELATED APPLICATIONS

Not Applicable.

STATEMENT REGARDING FEDERALLY SPONSORED-RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed broadly relates to the field of data and document management software. More particularly, the present invention relates to an improved method of determining, in a manner that requires less processing time than prior art methods, whether a set of XML or text documents, known to conform to a first schema, are valid with respect to a second schema.

BACKGROUND OF THE INVENTION

To ensure that data satisfy certain structural and non-structural constraints, it is common to use a schema, or data model, which provides a template for the data or document. One common representation for data is the Extensible Markup Language, or XML, which comprises a simplified subset of the Standardized Generalized Markup Language, or SGML. Unlike other subsets of SGML such as the Hypertext Markup Language (HTML), XML permits users to define new element labels and to nest XML elements within one another. Generally, schemas are used to constrain what labeled elements may appear in an XML document and how they may be arranged; an XML document conforms to a schema if the structure of the document satisfies the constraints specified by the schema. A schema for an XML document is built up out of type definitions. Together, the type definitions specify constraints on the structure of elements in an XML document such as, for example, the attributes that elements in the document may contain, the mandatory or optional nature of the elements, and the order in which the elements appear, and what other elements may be nested within an element.

One basic schema specification standard for XML is the DTD (Document Type Definition). In many XML applications, there is a DTD definition that specifies the XML format and one or more XML documents that conform to the DTD. Another common formalism for specifying the format of XML documents and data is the XML Schema. An XML Schema definition sets forth the layout format of documents that conform to the schema. This layout format includes which elements appear in each document and the data type for each element (such as whether it is numeric, binary, character, image, etc.). In addition, the XML Schema definition or DTD definition may include relational information that specifies how the various elements in conforming documents are related to each other. For example, for data that has a hierarchical structure, parent and child relationships will be described in the schema.

More generally, schemas may be any of a DTD, an XML Schema, or a string specification schema (such as a regular expression, a grammar or a finite state automaton), and documents may be either an XML document or a string.

Often documents or data objects that conform to a particular schema need to be verified as conforming with (i.e. recast into) another schema. For example, a business may have been saving and processing its customer records in accordance with a particular schema. However, the business may now desire to store its records in accordance with a new schema. In order to insure compatibility between its old and new records, the business may desire to recast the prior records into the new schema. As a further example, a program that processes documents typically expects to receive the documents in a particular format. If a business desires to process certain documents that are structured in accordance with a different schema with the program, it may be necessary to recast the documents into the appropriate schema.

Unfortunately, it is sometimes impossible to cast a particular document from one schema into another schema. For instance, the new schema may require a nonzero value for a particular element that is not present in the document in the first schema. Thus, in order to cast a document into a new schema, the document in the first schema must be valid in the second schema. The prior art method of validating a document in a schema is to examine each element that is going to be cast in the schema to determine if it is valid in the schema. Since businesses often have voluminous records, examining each individual element of each document in a particular schema to determine if it will be valid in a second schema can be a very time consuming process. Therefore, what is needed is an improved method of determining whether or not a document is valid with respect to a particular schema given that it conforms to another schema.

SUMMARY OF THE INVENTION

A preferred application (henceforth referred to as Application 1) of the present invention is directed towards a method of validating a document structured as an ordered tree having labeled elements, known to conform to varying element types in accordance with a first schema, with respect to a second schema. The method includes preprocessing the first and second schemas to identify subsumed type-pairs, of the form type1-type 2 where type1 is a type defined in the first schema and type2 is a type defined in the second schema. Such a pair indicates that an element's content that conforms to the first type, type1, will also conform to the second type, type2. For XML Schema, the method includes identifying subsumed element tag-type-pairs, of the form tag-type1-type2, where tag is an element name, type1 is a type in the first XML Schema and type2 is a type in the second XML Schema; it indicates that if the specified element tag appears in a document conforming to the first schema with content of type1, then this element tag can validly appear in a document conforming to the second schema and its content will conform to type type2. Similarly, disjointed type-pairs and disjoint element tag-type-pairs are also identified. Disjoint type1-type2 where type1 is defined in the first schema and type2 is defined in the second schema, indicates that no content that conforms to type1 can also conform to type2. Disjoint tag-type1-type2 indicates that if the specified element tag appears in a document conforming to the first schema with content of type1, then this element tag cannot appear in a document conforming to the second schema where to be valid its content must conform to type type2. If a type-pair, or element tag-typepair, is neither subsumed nor disjoint, it is called intersecting. Intuitively, intersecting means "sometimes valid in the second schema".

A document known to conform to the first schema is immediately validated for the second schema only if all element tag-type-pairs in the first schema that can apply to root nodes of the document are subsumed by all element tag-type-pairs in the second schema that can apply to root nodes of the document. A document is immediately invalidated in the second schema if all such element tag-type-pairs are of the disjoint kind. Otherwise, portions of the document need be examined as we now describe. The topmost element of the document is examined and its tag and type according to the first schema, type1, is either determined or read (if stored). The type type2 according to the second schema is determined by examining the schema. If tag-type1-type2 is a subsumed element tag-type-pair the document is validated according to the second schema. Otherwise, if tag-type1-type2 is disjoint, or if type1-type 2 is disjoint, then the document is immediately invalidated. Otherwise, the tags of the children of the top element are examined. If it is determined that they cannot possibly conform to type2 (that part is called "content model verification") the document is invalidated according to the second schema. Since the validation process with respect to the second schema can stop with a validation or invalidation after only part of the document has been explored, due to types being disjoint or subsumed appropriately, there is significant gain to the state of the art where the whole document must necessarily be processed.

Another application (henceforth referred to as Application 2) of the present invention is directed toward a method for determining whether or not a string data set conforming to a first string schema can be cast in a second string schema without validating all of the data set in accordance with the second schema. The method includes checking whether the schema-pair schema1-schema2 is subsumed (i.e., any string conforming to the first schema also conforms to the second schema), is disjoint (i.e., no string conforming to the first schema can conform to the second schema), or otherwise intersecting. The method includes checking if the schema-pair schema1-schema2 is subsumed, and if so validating it immediately. The method also includes checking if schema1-schema2 is disjoint, and if so invalidating it immediately. If the pair schema1-schema 2 is intersecting, an automaton (a simple computation device) is constructed out of the pair schema1-schema2. The automaton needs only examine the relevant portions of the document to determine whether the document conforms to schema2. Such an automaton is called "an immediate decision automaton". Interestingly, such automata can greatly enhance computational efficiency if used in the "content model verification" of the previous method. This will be further explained later on.

Yet another application (henceforth referred to as Application 3) of the present invention is directed toward a method of determining whether a document conforming to a first DTD schema may be cast in a second DTD schema without validating certain portions of the document in accordance with the second schema by comparing the first schema and the second schema. The method involves first checking whether every element tag-type-pair that can apply to root nodes of a document is subsumed and if so we have validation according to the second schema. Observe that for DTDs, for each tag there is at most one type in the first schema and at most one type in the second schema. Otherwise, one can invalidate the document immediately with respect to the second schema if every element tag-type-pair that can apply to root nodes of a document is disjoint. Otherwise, if there is an occurrence of a tag-type1 combination in the document such that tag-type1-type2 is disjoint, the document is invalidated according to the second schema. Otherwise, all occurrences of element tags, tag, such that tag-type1-type2 is intersecting are checked to verify that their content model is according to type2. If so, the document is validated, and otherwise invalidated, according to the second schema. These occurrences may be accessed directly, if a mechanism enabling this exists; otherwise, the document is processed recursively as in the case of the method for XML Schemas we have previously described. In checking these occurrences, the method of Application 2 (strings) may be used in verifying content models.

Yet another application (henceforth referred to as Application 4) of the present invention is directed toward a method of determining whether a document, whose original version (henceforth referred to as the original) prior to applied modifications conforms to a first schema, can be checked for conformance to a second schema without validating every element of the document. Modifications include any sequence consisting of or having the effect of changing the tag of an element, inserting a new leaf node at a specified location, or deleting a specified leaf node. The method utilizes knowledge as to which subtrees contain new or modified content, and which have their original document content, to examine only relevant portions of the document. In this method, new portions need to be verified for conformance to the second schema, whereas for unmodified subtrees (that may be contained within modified subtrees) the method of Application 1 and Application 2 may be used to further limit the computational effort.

Yet another application (henceforth referred to as Application 5) of the present invention is directed toward a method for determining whether or not a string data set, whose original version (henceforth referred to as the original) prior to applied modifications conforms to a first string schema can be cast in a second string schema without validating all the data set in accordance with the second schema. The method includes the construction of an immediate decision automaton for the second schema and an immediate decision automaton based on both schemas. The first automaton is used over the leftmost part of the document, up to a point beyond which there are no modifications. In so doing, it may accept (respectively, reject) that is validate (respectively, invalidate) according to the second schema. If no decision is reached, the automaton based on both schemas is used thereafter. Here too there are great potential savings as compared with the state of the art method of rechecking. This method is also useful within Application 4 in verifying content models.

Yet another application (henceforth referred to as Application 6) of the present invention is directed toward a method of determining whether a document, whose original version (henceforth referred to as the original) prior to applied modifications conforms to a first DTD schema may be cast in a second DTD schema without validating certain portions of the document in accordance with the second schema by comparing the first schema and the second schema. This method is further described in the detailed description.

BRIEF DESCRIPTION OF THE DRAWINGS

FIGS. 1(a) and (b) show an exemplary source and target XML schema;

DETAILED DESCRIPTION

Referring now to FIGS. 1(a) and 1(b), exemplary fragments of a first XML schema or document structure and a second XML schema are shown. The first and second schemas both have element type declarations for the element "purchaseOrder". The only difference between the schema of FIGS. 1(a) and (b) is that the "billTo" element is defined as optional in the schema of FIG. 1(a) and is required in the schema of FIG. 1(b). This difference is the result of "minOccurs" being set to zero in the schema of FIG. 1(a). Unfortunately, if a company had its records stored in accordance with the schema of FIG. 1(a) and wanted to recast the records into the schema of FIG. 1(b), the records in accordance with the schema of FIG. 1(a) that lack a "billTo" element would be invalid when cast into the schema of FIG. 1(b). Thus, the element type "purchaseOrder" as set forth in the schema of FIG. 1(a) is only sometimes valid when cast into the schema of FIG. 1(a). Since the company may have millions of these records, the company would want to identify which records could be recast into the new schema, and which ones could not be recast, as quickly and as efficiently as possible.

Figure 2:
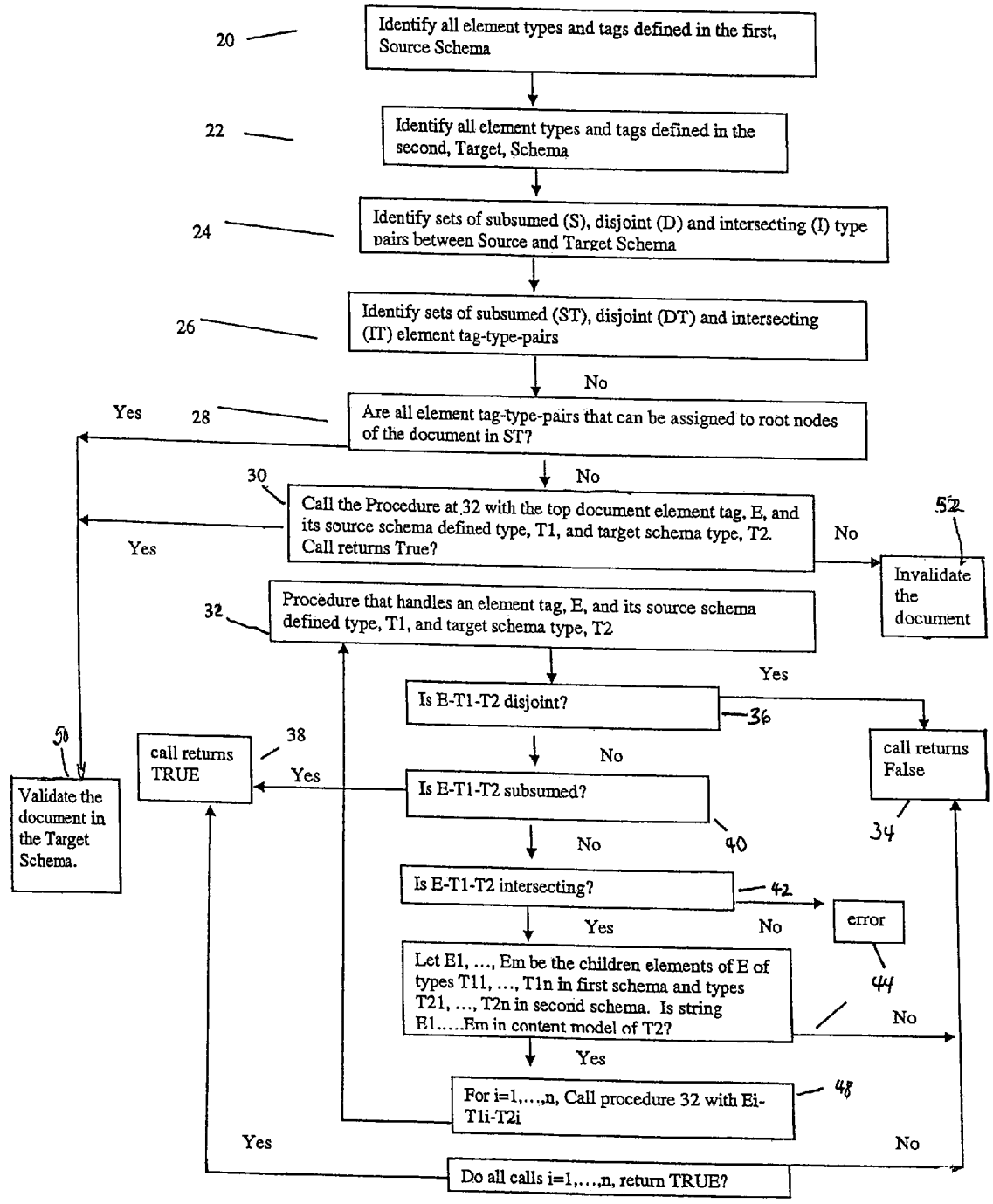
FIG. 2 is an illustration of a preferred method for determining whether a document that is valid in a first schema is valid in a second schema in accordance with an embodiment of the present invention (Application 1)

A preferred method of determining whether or not a document that is structured in accordance with a first schema can be recast into a second schema is set forth in FIG. 2. The method begins in step 20 with identifying all of the element types and element tags defined in the first (source) schema and their possible pairings. The method then proceeds to step 22 wherein it identifies all of the element types and element tags defined in the second (target) schema and their possible pairings. The method then identifies sets of subsumed (S), disjoint (D) and intersecting (I) type-pairs in step 24.

In step 26, the method identifies sets of subsumed (ST), disjoint (DT) and intersecting (IT) element tag-type-pairs. In step 28 the method examines ST, DT and IT. If all element tag-type pairs that can be applied to root elements of a document are in ST, then the document may be validated as conforming to the target schema as set forth in step 50. Otherwise proceed to step 30. In step 30, the top-most element tag of the document is identified, as well as its type according to the source schema (T1) and the target schema (T2). The method then calls the procedure of step 32. If TRUE is returned the document is validated according to the target schema in step 50 and if FALSE is returned the document is invalidated according to the target schema in step 52. Step 32 is the entry point to a procedure that accepts the document and a portion (subtree) with tag E whose type as determined for the source schema is T1 and according to the target schema it is T2. In step 36 the method checks whether E-T1-T2 is disjoint. If so, there is no point in the procedure further checking this subtree further and FALSE is returned in step 34. Otherwise, the method proceeds to step 36 where it checks whether E-T1-T2 is subsumed. If the answer is YES, the procedure can immediately return TRUE in step 38. Otherwise, the procedure proceeds to check whether E-T1-T2 is intersecting. This should be the case, and if not, there must have been an error and the method's execution aborts with an error in step 44. Otherwise the procedure proceeds to step 46, wherein the children, say n of them, of the element under consideration are identified, as well as their element tags (Ri), and types according to the source schema (T1i) and according to the target schema (T2i), for i=1, . . . , n. The procedure then proceeds to step 48 wherein it then performs up to n calls, one per child. In step 54, these calls return, if any returns FALSE, the procedure call returns FALSE in step 38. If all return TRUE, the procedure call returns TRUE in step 34.

The present inventors have discovered that by limiting the portions of the document that need to be reviewed to determine its validity as set forth in more detail above and below, the amount of processing time required to validate a document can be substantially reduced. In particular, the structure of the source schema and its relationship to the target schema can be used to reduce the amount of the document that must be reviewed to determine its validity with respect to the target schema. The amount of reduction in the portions of the document that must be reviewed and the corresponding amount of processing time required to validate the document depend upon a number of factors such as the relationship between the source and target schema and the number of documents that need to be validated. However, the time required to process a given document can easily be reduced by as much as 50% in certain situations.

Figure 3:
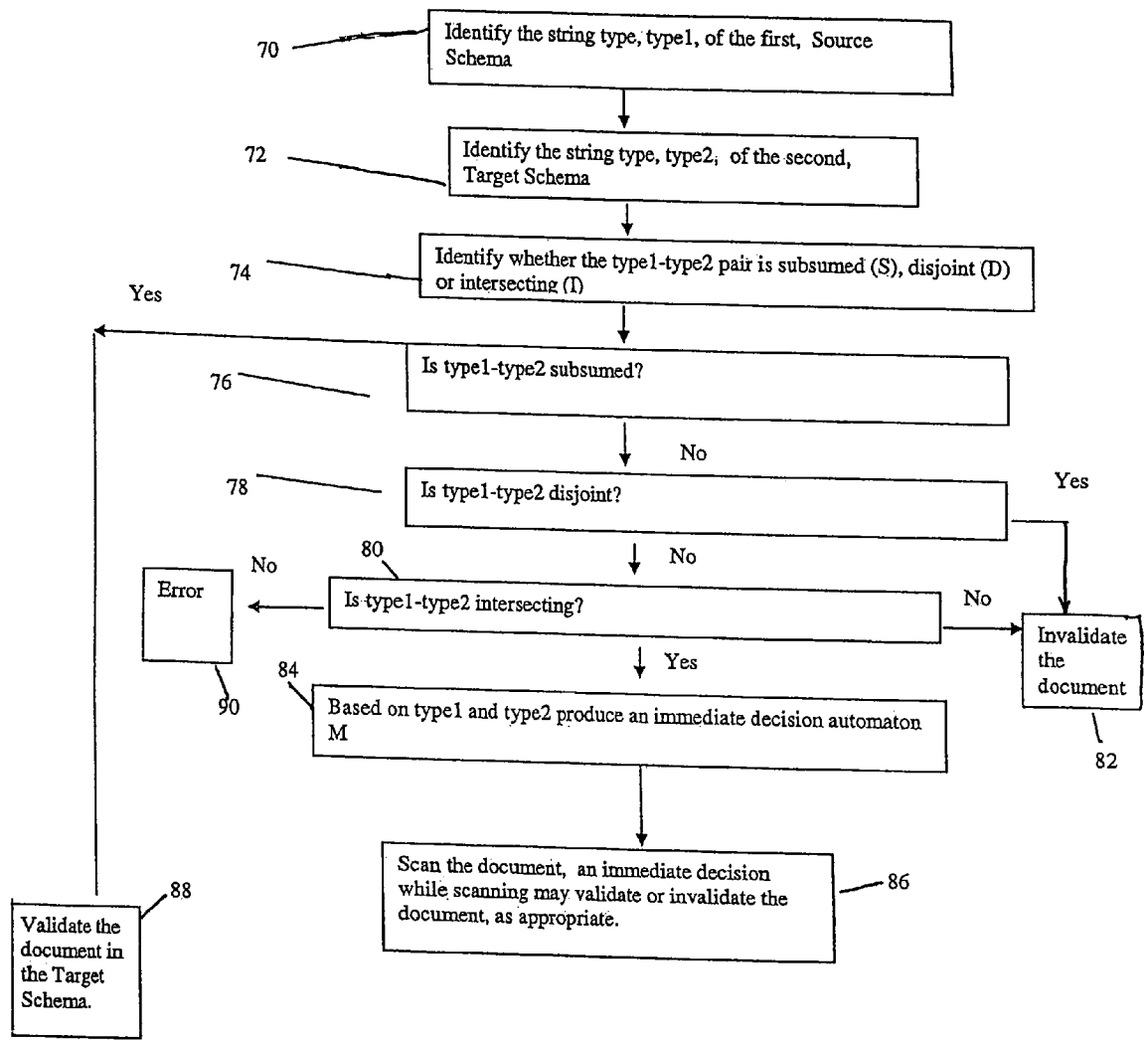
FIG. 3, is an illustration of a preferred method for determining whether a string document that is valid in a first string schema is valid in a second string schema in accordance with an embodiment of the present invention (Application 2)

Referring now to FIG. 3, a preferred method of determining whether or not a document that is structured in accordance with a first string schema can be recast into a second string schema is set forth. Such schemas may be specified with various known formalisms, including but not limited to: regular expressions, grammars, finite state automata, or a combination thereof. The method begins in step 70 with identifying the schema types of the first (source) schema and then onwards to step 72 with identifying the second (target) schema. The method then proceeds to step 74 wherein analysis is performed to determine subsumption, disjointness or intersection of the schema pair type1-type2. In step 76, if subsumption is detected, the document may be immediately validated according to the second schema as set forth in step 88. Otherwise, the method proceeds to step 78. In step 78, in case disjointness is detected, the document may be immediately invalidated according to schema 2 which is done in step 82. Otherwise, the method proceeds to step 80. In step 80, if intersection (the only remaining logical choice) is not detected, an error must have occurred and the method proceeds to step 90 wherein an error is communicated. Otherwise the method proceeds to step 84 in which an immediate decision automaton for type1 and type2 is constructed. An immediate decision automaton is similar to a standard finite automaton, except that while scanning its input such an automaton can accept, or reject, its input prior to scanning the whole input. The particular immediate decision automaton, based on type1 and type2, has such immediate transitions that are partially based on the knowledge that the input under consideration conforms to type1. Details of the construction are in "Documents Revalidated: Casting XML Documents in a Different Light" to which a reference was previously made. The method then proceeds to step 86. In step 86, the string document is scanned. During the scanning, the automaton may accept (validate) or reject (invalidate) the string document prior to completing its scanning, thereby realizing a substantial efficiency gain.

The method set forth in FIG. 3 reduces the time required to validate a string document. First, it may avoid scanning the document if the type-pair is disjoint or subsumed. Second, in the case of an intersecting pair, by only revalidating a prefix of the document, substantial savings may often be realized.

Figure 4:
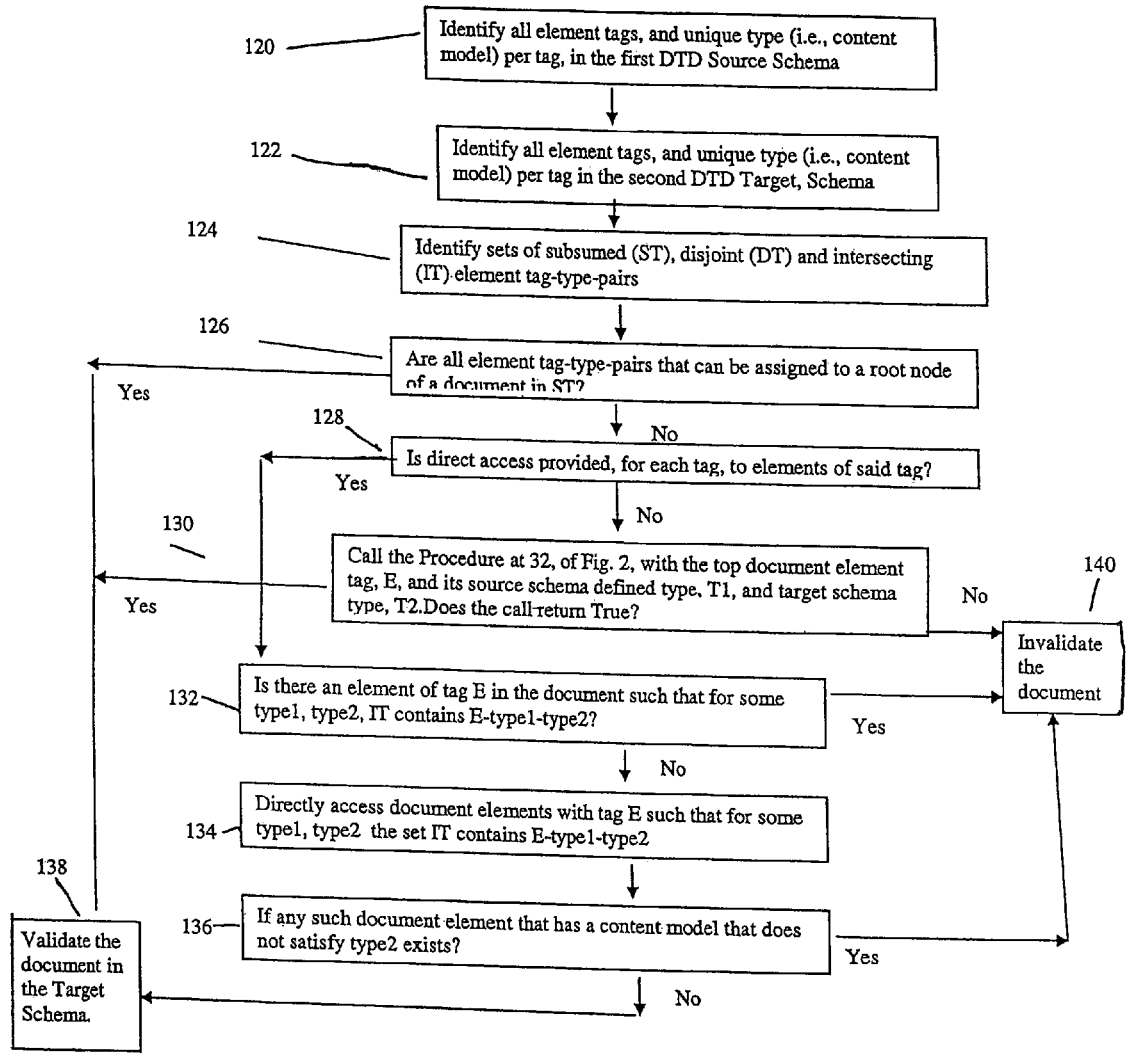
FIG. 4, is an illustration of a preferred method for determining whether a document that is valid with respect to a first DTD schema is valid with respect to a second DTD schema in accordance with an embodiment of the present invention (Application 3)

Referring now to FIG. 4, a preferred method of determining whether or not a document that is structured in accordance with a first DTD schema can be recast into a second DTD schema is set forth. The method commences in step 120 wherein all tags in both DTDs, DTD1 defining the first, source, schema, and DTD2 defining the second, target, schema are identified. In DTD based schemas, each element tag is associated with exactly one type, or content model. In step 124 the sets of subsumed (ST), disjoint (DT) and intersecting (IT) element tag-type-pairs are computed. This computation is based on comparing automata corresponding to content models. Step 126 examines if all element tag-type-pairs that can apply to root elements of a document are in ST. If so, the document may be validated immediately (at step 138). Otherwise, in step 128, a decision is made based on whether given a tag, all document element occurrences that use this tag may be accessed directly, that is without scanning sequentially through the document. If this is not the case, the method proceeds to step 130. In step 130, the procedure 32 of FIG. 2 is utilized. If the procedure call returns TRUE, then the document is validated (in step 138), else it is invalidated (in step 140). In the case where direct access to elements based on tags is provided, the method proceeds to step 132. In step 132, the method checks whether the document contains an element whose tag, E, is associated with type1 in the source schema and type2 in the target schema such that E-type1-type2 is in DT. The existence of such an element occurrence in the document invalidates it. Such invalidation is declared in step 140. Otherwise, the method proceeds to step 134. In step 134, the elements in the document such that their tags appear together with some types, type1 and type2, in IT are accessed. Such elements identify "suspicious" (i.e., non-complying or invalidating) portions of the document. The method checks, in step 136, whether for such "suspicious" elements their content in the document satisfies the content model associated with their tag in the target schema. If for any such element satisfaction is not determined, the document is invalidated according to the target schema (step 140). If for all such elements satisfaction is detected, the document is validated according to the target schema (step 138). We note that checking compliance with a content model is a simple process that is limited to the element being tested. In addition, this compliance testing may be done sequentially, in parallel, or in combination thereof. Further, in some storage modes of XML documents, such as DOM, this test need not affect all the data in the tested element, rather, only the "top level" parent-child relationships need be checked. At any rate, the method of Application 2 (for strings, that uses automata-based techniques) may be used to speed up this test.

Figure 5:
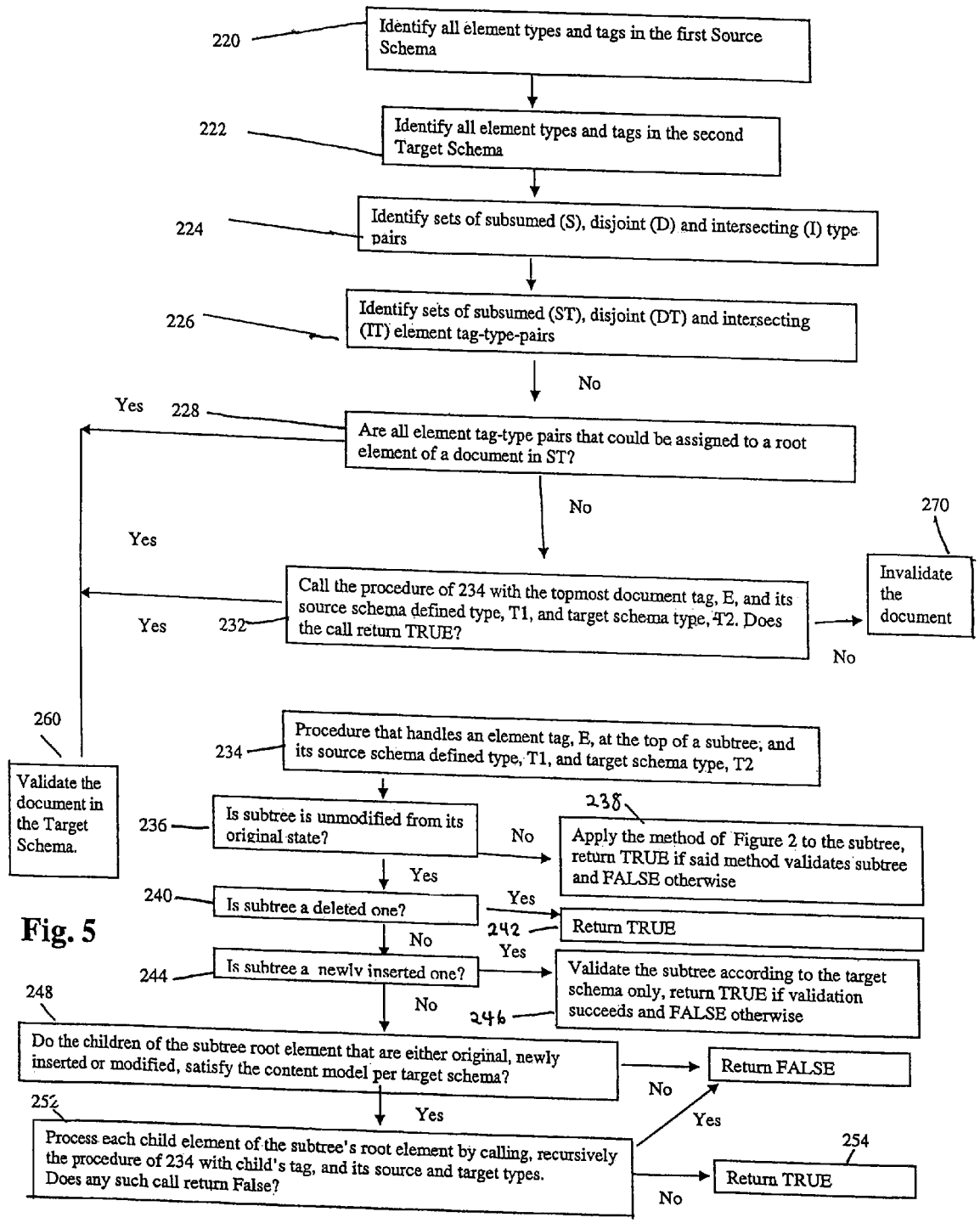
FIG. 5 is an illustration of a preferred method of casting a document that was valid in a first schema prior to being modified into a second schema in accordance with an embodiment of the present invention (Application 4)

Referring now to FIG. 5, a preferred method of validating a modified document with respect to a schema B wherein the document was previously, in its original form, validated with respect to a schema A and then modified, is shown. The method commences in step 220, wherein tags and types according to the first, source, schema are identified. Such identification is then performed for the second, target, schema, in step 222. In step 224 subsumed, disjoint and intersecting type-pairs are identified. Then, in step 226, subsumed (ST), disjoint (DT) and intersecting (IT) element tag-type-pairs are identified. In step 228, if all element tag-type pairs that can apply to root nodes are in ST, validation may be deduced, in step 260. Otherwise the method proceeds to call the procedure in step 234 in step 232, with the whole tree as the subtree to be considered by the procedure. If the procedure call returns TRUE, validation is deduced in step 260, otherwise invalidation is deduced in step 270. We now describe the procedure defined in step 234 which contains the explicit handling of modified subtrees of this currently described method. Given a subtree to consider, in step 236, the procedure determines whether the subtree under consideration has been modified from its original state. If it has not been modified, the method of FIG. 2 is applied in step 238 and a result is appropriately returned. Otherwise, the subtree is not in an original subtree state. Step 240 then checks whether the subtree is a deleted subtree. In this case, it may be ignored and hence TRUE is returned in step 242. Otherwise, the procedure checks in step 244 whether this subtree is newly inserted. If so, then there is no 'prior information' to be utilized and the subtree is validated by itself in step 246 which returns TRUE if validation succeeds and FALSE otherwise, as the results of this procedure call. Otherwise, the subtree is a modified subtree and the procedure proceeds to step 248. In step 248, the actual present tags of children of the subtree root element are considered. These are either original tags, modified tags or newly inserted tags. As a sequence, they are tested for satisfying the content model requirement of the subtree root tag and its type in the target schema. They are also temporarily labeled with their expected types according to the target schema. If the actual content does not conform to the content model according to the target schema, the procedure returns FALSE in step 250. Otherwise, the children tags are also associated with their types according to the source schema (only original non-deleted children are so labeled) and the procedure proceeds to step 252. Step 252 considers the children, their tags, their types according to the source schema and according to the target schema. A recursive call is performed for each child with a new subtree root (namely the child element), the source type, if any, and the expected target type, if any. These calls may be done sequentially, in parallel, or in combination thereof. If any such call returns FALSE, no more calls are performed, and FALSE is returned (step 250) as the result of this procedure call. Otherwise, all calls returned TRUE, and TRUE is returned in step 254 as the procedure call result.

As is apparent from the description of Application 4 in FIG. 5, this method may realize substantial savings by quickly validating unmodified subtrees by essentially applying the method of Application 1 (FIG. 2) to such subtrees, by ignoring deleted subtrees, by validating "stand-alone" newly inserted subtrees, and by efficiently handling modified tags by processing "in parallel" their children, thereby being able to utilize the knowledge of conformance to the source schema even as progressing "down the tree" over modified elements (this is the essence of step 252). A special case of this scenario would be when the modifications to the first schema result in the first schema being the same as the second schema. In such a case, it would only be necessary to validate the documents with respect to either the first schema or the second schema in order to establish the documents validity with respect to both schemas.

Figure 6:
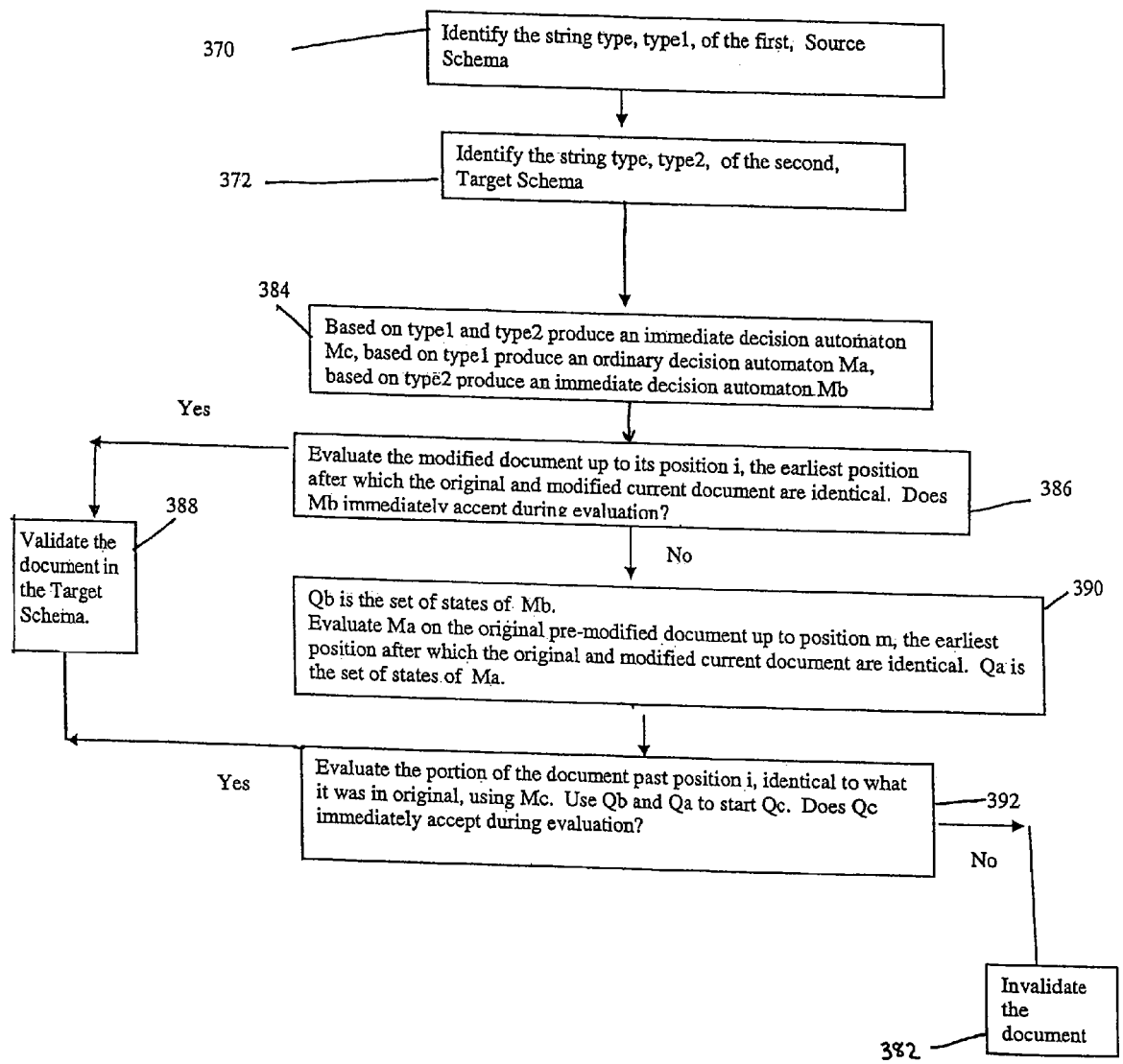
FIG. 6 is an illustration of a preferred method of casting a string document that was valid in a first string schema prior to being modified into a second string schema in accordance with an embodiment of the present invention (Application 5)

Referring now to FIG. 6, a preferred method of validating a modified document with respect to a string schema B wherein the document was previously, in its original form, validated with respect to a string schema A and then modified, is shown. The method commences in step 370, wherein the type according to the first, source, schema is identified. Such identification is then performed for the second, target, string schema, in step 372. The method proceeds to step 384. In step 384, three automata are constructed, Ma—an ordinary automaton for validating documents according to type1, Mb—an immediate decision automaton for validating documents according to type2, and Mc—an immediate decision automaton for validating documents that are valid according to both type1 and type2, which is built out of Ma and Mb (its set of states is the cross product of the set of states of Ma and the set of states of Mb). The method proceeds to step 386. In step 386, Mb is evaluated against the document, up to and including the rightmost position beyond which the document is identical to what it was originally, call this position i. During this evaluation, Mb may accept, in which case the document is validated according to type2 in step 388. Otherwise, Mb terminates the evaluation in a set of states Qb. The method proceeds to step 390. Evaluate Ma on the original document up to position m such that the original string past position m is identical to the modified document past position i. Let Qa be the resulting set of states. The method proceeds to step 392. At this point, Qa and Qb are used to initialize the starting set of states, Qa X Qb (we use X to denote the cross product), of Mc, which is operated to evaluate the document past position i. If Qc accepts, possibly immediately during evaluation, then the document is validated in step 388. Otherwise, the document is invalidated in step 382.

As is apparent from the description of Application 5 in FIG. 6, this method may realize substantial savings by applying the automaton Mb to the modified portion and the automaton Mc to the unmodified (identical to original) suffix of the document. The method of Application 5 can be used in verifying content models within Application 4, thereby improving Application 4.

Figure 7:
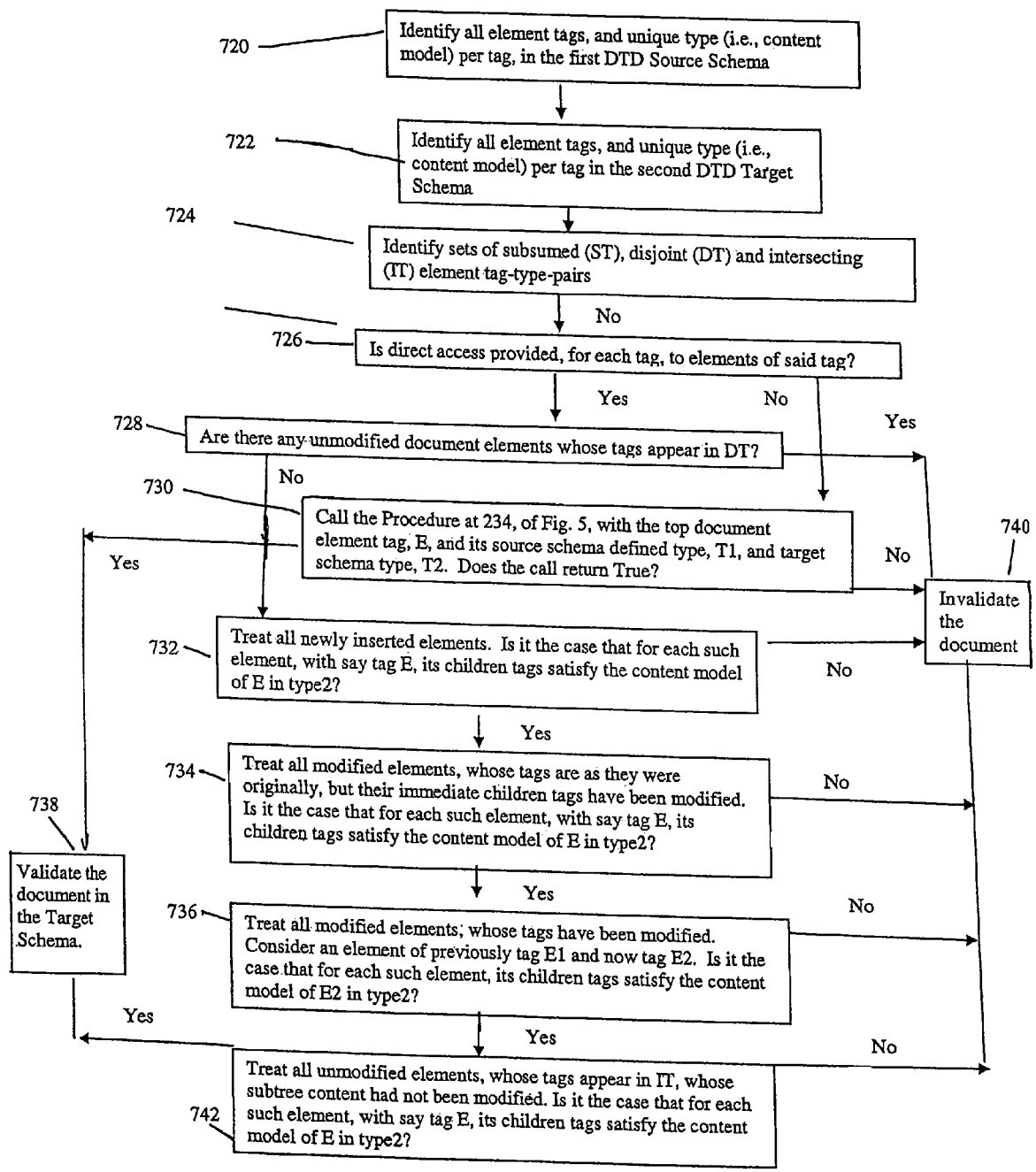
FIG. 7 is an illustration of a preferred method of casting a document that was valid in a first DTD schema prior to being modified into a second DTD schema in accordance with an embodiment of the present invention (Application 6)

Referring now to FIG. 7, a preferred method of validating a modified document with respect to a DTD schema B wherein the document was previously, in its original form, validated with respect to a DTD schema A and then modified, is shown. The method commences in step 720 with identifying tags and types in the first, source, schema; then proceeds to step 722 and identifies tags and types in the second, target, schema. The method then proceeds to step 724 wherein tags (that completely determine the element tag-type-pair combination) are classified as subsumed, disjoint or intersecting. If, in step 726, direct access to element tags is not provided, the method calls, in step 730, the Procedure at step 234 of Application 4 (FIG. 5). Based on the call, the document is either validated (TRUE is returned) or invalidated (FALSE is returned). Otherwise, direct access is provided, for example by using a tree data structure, and the method proceeds to step 728. In step 728, the method checks whether there are any unmodified document elements whose tags appear in DT (i.e., cannot possibly be valid according to their content model in the target schema). If such elements exist, the method invalidates the document in step 740, otherwise it proceeds to step 732. In step 732, newly inserted elements are treated (in parallel, or sequentially). For each such element, if its children tags do not satisfy its content model (i.e., of type2) according to the target schema, the document is invalidated (in step 740). Otherwise, the method proceeds to step 734 wherein the method treats all modified elements, whose tags are as they were originally, but their immediate children tags have been modified. (Access to such elements is provided by accessing new elements or elements whose tags were modified and proceeding to their parents.) The method checks whether it is the case that for each such element, with say tag E, its children tags satisfy the content model of E in type2. If it is the case, the method proceeds to step 736, otherwise the method invalidates the document in step 740. In step 736, the method treats all modified elements, whose tags have been modified. Consider an element previously having tag E1 and now having tag E2. The method checks whether it is the case that for each such element, its children's tags satisfy the content model of E2 in type2. In case they do, the method proceeds to step 742 and otherwise invalidates the document according to the target schema in step 740. In step 742, the method treats all unmodified elements, whose tags appear in IT. The method checks whether it is the case that for each such element, with say tag E, its children's tags satisfy the content model of E in type2. If it is the case that not all unmodified elements are such, the document is invalidated in step 740. Otherwise, it is validated in step 738.

It is apparent that the method of Application 6 (FIG. 7) can realize substantial efficiency over ordinary methods of revalidation. As is apparent, only relevant portions of the document are examined. In performing step 734, the method of Application 5 can beneficially be used. In performing step 742, the method of Application 2 can beneficially be used. In performing step 736, the method of Application 2 may be used (if children tags are unchanged) or the method of Application 5 may be used (if children tags were changed). The usage of the methods of Applications 2 and 5 can further enhance performance of this method (Application 6).

Figure 8:
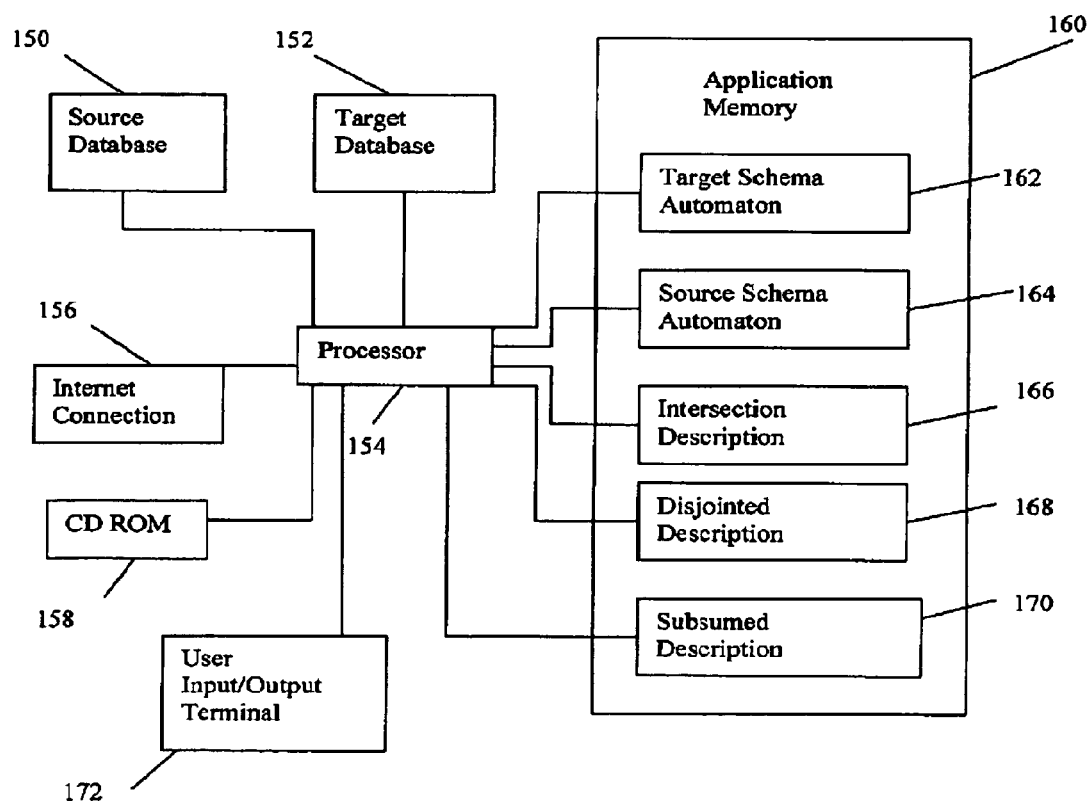
FIG. 8 is an illustration of an information handling system constructed in accordance with present invention.

Referring now to FIG. 8, a block diagram of an information handling system constructed in accordance with an embodiment of the present invention is shown. The information handling system is for retrieving documents that have been validated in conformance with a source schema from a source database 150, validating the documents in accordance with a target schema and storing the documents in a target database 152. A processor 154 controls the information handling system. While the information handling system is described as a single entity with regard to FIG. 8, it will readily be appreciated by those skilled in the art that the functions performed by the invention could be spread across the World Wide Web or a more localized network. For example, the source database 150 and target database 152 could be stored in a local memory or on a storage device such as a compact disc and accessed via a CD ROM 158. Alternatively, the source database 150 and target database 152 could be stored remotely and accessed via an internet connection 156 or dial up connection (not shown). Thus, although, the nature of modern computing allows the various functions of the invention to be implemented separately at different remote locations under the control of the processor 154, the functions and equipment for implementing the invention are unchanged.

The processor 154 first creates the first source schema description 164, which is stored in an application memory 160, from a schema in the source database 150. The source schema description 164 identifies the various types of information or elements present in any document that conforms to the source schema description and the general layout or structure of such a document. A document type definition or standardized XML schema could be used by the processor 154 to create the source schema description 164. The processor 154 then creates a target schema description 162 which is also saved in the application memory 160 from a schema from the target database 152. In a fashion similar to the source schema description 164, the target schema description 162 specifies the expected type and structure of the data contained in a document that conforms to the target schema. Alternatively, the target schema description 162, like the source schema description 164, may be independently created and retrieved by the processor 154 from a remote source.

Once the source schema description 164 and target schema description 162 have been retrieved by the processor 154, they are preprocessed by the processor to also create a subsumed description 170. The subsumed description 170 identifies element tag-type-pairs, of the form tag-type1-type2, such that if a document element with the tag is determined to have type1 with respect to the source schema then it conforms to type2 according to the target schema. For example, if an element type in the target schema covers every possible element of a source schema element type, the target element type subsumes the source element type. In such a case, all elements in a source document of the subsumed element type are necessarily valid in the target schema according to the subsuming type. Therefore, the subsumed description 170 is used to identify element types in the document that conform to the source schema that are immediately identifiable as valid in the target schema. A disjointed description 168 is also created by the processor 154 and stored in the application memory 160. The disjointed description 168 is used to identify immediately invalidating conditions in the documents valid with respect to the source schema that immediately result in the document being declared invalid with respect to the target schema. More particularly, the disjointed description 168 identifies element tag-type-pairs, of the form tag-type1-type2, such that when an element with the tag is determined to have type1 according to the source schema then it cannot be validated as having type2 with respect to the target schema. If any of these elements with such a tag and type according to such type1 are present in a document in the source database 150, the document can not be cast into the target schema without being modified. Finally, the source definition schema 164 and the target definition schema 162 are processed to generate an intersection description 166. As discussed above, the intersection description 166 identifies element tag-type-pairs, of the form tag-type1-type2 such that an element with the tag of type1 which is valid with respect to the source schema is sometimes valid according to type2 in the target schema. The intersection description is created by comparing the element definitions in the source schema to those in the target schema and making decisions about whether document elements valid according to an element type defined in the source schema can be valid with regard to an element type defined in the target schema. Thus, depending upon the particular layouts of the source schema and the target schema, the intersection description 166 may or may not exist. The above exposition was in terms of element tag-type-pairs. The above descriptions (disjoint, subsume, intersecting) also contain such information with respect to types alone (in addition to such information in conjunction with tags). The reader versed in the art realizes that the source and target schema specifications may be in terms of XML Schema or similar language (e.g., for specifying web services formats), in terms of DTDs or in terms of string schemas. Further, the description may also be in terms of a schema language for databases (such as ERD, SQL, OMG) or for an object layout specification (as in Java, C# and C++). The techniques of this invention are suitable for casting also between different formalisms, for example from XML document to Java objects. Those versed in the art may also appreciate that documents may be stored in various formats in the databases 150 and 152. Such formats include but are not limited to: raw text, compressed text, DOM, serialized DOM, serialized programming objects, and streams.

An exemplary use of the information handling system shown in FIG. 8 is set forth below. The process begins with the processor 154 receiving a request to cast a series of documents stored in a source database 150 in accordance with a source schema into a target schema. The request could be received from the internet connection 156 or a user input/output terminal 172. The request preferably identifies a set of documents to be validated, a target schema in which to validate the documents and a location in which to store the recast documents. Once the processor 154 has received the request, the processor 154 creates the descriptions 162, 164, 166, 168 and 170 as set forth above. The processor 154 then retrieves the first document to be validated from the source database 150 and examines the document with the disjointed description 168. If the disjointed description 168 and the intersection description 166 are both empty, the document is immediately validated as it contains only subsumed element-type-pairs, and the processor 154 retrieves the next document from the source database 150. Otherwise, the processor 154 examines the document, starting at the topmost element. The examination is a recursive process that is now explained with respect to any element with an element tag, tag, and type, type1, with respect to the source schema whose determined type should be type2 with respect to the target schema. For such an element, the following cases are considered:

tag-type1-type2 is in the disjoint description 168. In this case invalidation according to the target schema is immediate. The recursive call returns to its origin indicating success (FALSE).

tag-type1-type2 is in the subsumed description 170. In this case validation of the element is immediate with respect to the target schema. The recursive call returns to its origin indicating success (TRUE).

tag-type1-type2 is in the intersection description 166. In this case, we need to continue checking "down the tree". The children elements are considered. First it is verified that the concatenation of their tags is in the content model of type2. Then, each child element is validated, recursively, based on its assigned type according to the target schema. If all such recursive validations return TRUE, overall TRUE is returned out of this recursive call.

The present disclosure includes the portions that are contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

We claim:

1. A computer-implemented method for determining compliance between a source document structured in accordance with a source schema and a target schema, the method comprising steps of:

receiving a source schema description and a target schema description;

receiving the source document, wherein the source document comprises an ordered tree structure with labeled elements;

identifying all corresponding element types in the source and target schemas for grouping the corresponding element types into element type pairs, wherein the element type is an indication of the content of an element, and wherein the element type further comprises an element tag name for XML schema if the source schema is XML schema;

classifying each element type pair, according to their relationship, into one of a group consisting of: matching, disjointed, and intersecting;

confirming compliance of the source document if it is determined that all element type pairs corresponding to root elements of the source document are classified as matching; and confirming non-compliance of the source document according to the target schema if it is determined that at least one element type pair corresponding to a root element of the source document is classified as disjointed; and further:

if it is determined that at least one element type pair corresponding to the root element is classified as intersecting, performing steps of:
- identifying a subtree of the source document beginning with a topmost element of the source document, the subtree corresponding to the at least one element type pair classified as intersecting;
- classifying the topmost element type pair into one of a group consisting of: matching, disjointed, and intersecting;
- confirming compliance of the source document if it is determined that the topmost element type pair is classified as matching; and
- confirming non-compliance of the source document if it is determined that the topmost element type pair is classified as disjointed; and further:

if it is determined that the topmost element type pair is classified as intersecting, performing steps of:
- identifying a current child element pair of the topmost element type pair from the subtree, wherein the current child element pair comprises an element type pair from the source schema and an element type pair from the target schema;
- classifying the current child element pair into one of a group consisting of: matching, disjointed, and intersecting;
- confirming non-compliance of the source document if the current child element pair is classified as disjointed;
- processing a next child element pair from the subtree if the current child element pair is classified as matching, wherein the processing step further comprises comparing element pairs; and
- identifying the next child element pair from the subtree as the topmost element pair if the next child element pair does not belong to a same parent node as the current child element pair.

2. The method of claim 1 wherein the matching classification comprises a relationship between the element type pair such that portions of the source document that are in compliance with respect to the element type in the source schema are also valid with respect to the corresponding element type in the target schema.

3. The method of claim 1 wherein the disjointed classification comprises a relationship between the element type pair such that portions of the source document that are in compliance with respect to the element type in the source schema are not in compliance with respect to the corresponding element type in the target schema.

4. The method of claim 1 wherein the intersecting classification comprises a relationship between the element type pair such that some portions of the source document that are in compliance with respect to the element type in the source schema are in compliance with respect to the corresponding element type in the target schema and some portions of the source document that are in compliance with respect to the element type in the source schema are not in compliance with respect to the corresponding element type in the target schema.

5. The method of claim 1 wherein the source document is determined to be non compliant with respect to the target schema if said source document contains child element pairs that are identified as disjointed.

6. The method of claim 1 further comprising a step of:
developing an automaton from the child element pair determined to be intersecting to determine if a portion of the source document corresponding to the subtree is in compliance with the target schema.

7. The method of claim 1 wherein the source schema and the target schema are one of a group consisting of: a regular expression, a document type definition, a finite state automata, an XML schema and a tree automata.

8. The method of claim 1 wherein the source document is an XML document.

9. The method of claim 1 wherein the element types are one of a group consisting of: states in a finite state automaton, element type declarations in an XML schema, programming language types and states in a tree automaton.

10. The method of claim 1 further comprising a step of:
examining the source document for determining if any portions of the source document have been modified subsequent to the source document being determined to be in compliance and limiting the portions of the source document to be validated to those portions of the source document that have been modified.

11. The method of claim 10 further comprising a step of:
identifying elements of the source document that have been inserted subsequent to the source document being determined to be in compliance and immediately confirming compliance of those inserted elements.

12. The method of claim 10 further comprising a step of:
identifying elements of the source document that have been deleted subsequent to the source document being determined to be in compliance and ignoring any deleted elements when processing said source document to determine compliance with the target schema.

13. The method of claim 1 further comprising:
confirming compliance of the source document with respect to one of either the source schema or target schema when the source schema has been modified such that it is the same as the target schema.

14. The method of claim 1 wherein the identifying, classifying, confirming, processing and identifying steps are performed recursively until the current child element pair is classified as disjointed and then the source document is immediately determined to be non-compliant.

15. The method of claim 14 wherein the processing step is performed sequentially.

16. The method of claim 14 wherein the processing step is performed in parallel.

17. The method of claim 14 wherein the processing step is performed as a combination of parallel and sequential processing.

18. The method of claim 1 wherein determining compliance comprises ascertaining that the source document can be recast into the target schema without causing any loss of data.

19. The method of claim 1 wherein the step of receiving the schema descriptions further comprises creating the schema descriptions.

20. The method of claim 1 wherein the step of receiving the schema descriptions further comprises retrieving the schema descriptions from data storage.

* * * * *

UNITED STATES PATENT AND TRADEMARK OFFICE
CERTIFICATE OF CORRECTION

PATENT NO. : 7,596,748 B2  Page 1 of 1
APPLICATION NO. : 10/662799
DATED : September 29, 2009
INVENTOR(S) : Raghavachari et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 697 days.

Signed and Sealed this

Twenty-eighth Day of September, 2010

David J. Kappos
*Director of the United States Patent and Trademark Office*